US008698505B2

(12) United States Patent
Suzuki et al.

(10) Patent No.: US 8,698,505 B2
(45) Date of Patent: Apr. 15, 2014

(54) MEASUREMENT APPARATUS DETECTING CONSUMPTION CURRENT OF A DISPLAY

(75) Inventors: Shin Suzuki, Musashino (JP); Takashi Torimaru, Musashino (JP); Tooru Shimura, Musashino (JP); Fujikazu Sugawara, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 926 days.

(21) Appl. No.: 12/848,598

(22) Filed: Aug. 2, 2010

(65) Prior Publication Data
US 2011/0032236 A1 Feb. 10, 2011

(30) Foreign Application Priority Data

Aug. 6, 2009 (JP) .................................. 2009-183243
Aug. 18, 2009 (JP) .................................. 2009-188977

(51) Int. Cl.
*G01R 31/14* (2006.01)
*G01R 31/28* (2006.01)

(52) U.S. Cl.
USPC ............................ 324/511; 324/713; 324/522

(58) Field of Classification Search
USPC .......................................... 324/511, 713, 522
See application file for complete search history.

(56) References Cited

U.S. PATENT DOCUMENTS

| | | | | |
|---|---|---|---|---|
| 4,363,105 A | * | 12/1982 | Plassmeier | 702/118 |
| 4,375,072 A | * | 2/1983 | Rice | 361/87 |
| 4,766,447 A | * | 8/1988 | Tsukada | 347/129 |
| 4,811,136 A | * | 3/1989 | Jones et al. | 361/79 |
| 4,825,874 A | * | 5/1989 | Uhlemann | 600/523 |
| 5,227,984 A | * | 7/1993 | Meldrum et al. | 702/117 |
| 5,497,095 A | * | 3/1996 | Ueyama et al. | 324/537 |
| 5,644,463 A | * | 7/1997 | El-Sharkawi et al. | 361/94 |
| 5,796,259 A | * | 8/1998 | Dickmander | 324/524 |
| 5,910,875 A | * | 6/1999 | Tian et al. | 361/78 |
| 6,222,374 B1 | * | 4/2001 | Shoemaker | 324/537 |
| 6,489,778 B2 | * | 12/2002 | Martin | 324/500 |
| 6,807,507 B2 | * | 10/2004 | Kumar et al. | 702/124 |
| 6,856,147 B2 | * | 2/2005 | Zarkhin et al. | 324/693 |
| 7,102,357 B2 | * | 9/2006 | Kantorovich et al. | 324/522 |
| 7,492,559 B2 | * | 2/2009 | Zhang et al. | 361/42 |

(Continued)

FOREIGN PATENT DOCUMENTS

EP 1589517 A2 10/2005
EP 2026320 A2 2/2009

(Continued)

OTHER PUBLICATIONS

European Search Report issued Sep. 20, 2011 for counterpart European Application 10171536.5.

(Continued)

*Primary Examiner* — Patrick J Assouad
*Assistant Examiner* — Lamarr Brown
(74) *Attorney, Agent, or Firm* — Sughrue Mion, PLLC

(57) ABSTRACT

A measurement apparatus includes a display unit, a current detection unit configured to output a detection signal if an increase in a consumption current of the display unit is detected, a plurality of setting units each of which is configured to output an output signal, each of the plurality of setting units changing the output signal if the detection signal is received, and a diagnosis unit configured to receive the output signal, the diagnosis unit diagnosing the increase in the consumption current.

17 Claims, 7 Drawing Sheets

(56) References Cited

U.S. PATENT DOCUMENTS

| | | | |
|---|---|---|---|
| 7,847,573 B2* | 12/2010 | Ohashi | 324/756.05 |
| 8,274,459 B2* | 9/2012 | Kato et al. | 345/87 |
| 8,407,642 B2* | 3/2013 | Kanazawa | 716/111 |
| 8,531,190 B2* | 9/2013 | Kajita | 324/613 |
| 2002/0190734 A1* | 12/2002 | Burt et al. | 324/713 |
| 2003/0179004 A1* | 9/2003 | Fukusumi et al. | 324/713 |
| 2004/0008177 A1* | 1/2004 | Ahn | 345/102 |
| 2005/0275649 A1* | 12/2005 | Yokoyama | 345/204 |
| 2006/0097974 A1* | 5/2006 | Hashimoto et al. | 345/98 |
| 2006/0220686 A1* | 10/2006 | Suzuki et al. | 326/83 |
| 2006/0226849 A1* | 10/2006 | Liao et al. | 324/522 |
| 2007/0282557 A1* | 12/2007 | Uchida et al. | 702/113 |
| 2008/0001605 A1* | 1/2008 | Hu | 324/522 |
| 2008/0177503 A1* | 7/2008 | Stockman | 702/161 |
| 2008/0309636 A1* | 12/2008 | Feng et al. | 345/173 |
| 2009/0012374 A1 | 1/2009 | Schmelzeisen-Redeker et al. | |
| 2009/0167746 A1* | 7/2009 | Yoon | 345/211 |
| 2009/0184717 A1* | 7/2009 | Ivan et al. | 324/522 |
| 2009/0184718 A1* | 7/2009 | Ivan et al. | 324/522 |
| 2009/0244087 A1* | 10/2009 | Okano | 345/589 |
| 2011/0058296 A1* | 3/2011 | Orchowski | 361/88 |
| 2011/0140708 A1* | 6/2011 | Lueckenbach | 324/522 |

FOREIGN PATENT DOCUMENTS

| | | |
|---|---|---|
| JP | 54120595 A | 9/1979 |
| JP | 05327555 A | 12/1993 |
| JP | 10002770 A | 1/1998 |
| JP | 2001117507 A | 4/2001 |
| JP | 2006-295297 A | 10/2006 |
| JP | 2008-066104 A | 3/2008 |
| JP | 2009008857 A | 1/2009 |
| WO | 2004/023423 A2 | 3/2004 |
| WO | 2004111984 A1 | 12/2004 |
| WO | 2008146799 A1 | 12/2008 |

OTHER PUBLICATIONS

MAXIM, "MAX17014A," 2008, pp. 1, 17-19. Retrieved from the Internet: http://datasheets.maxim-ic.com/en/ds/MAX17014A.pdf.

European Search Report corresponding to European Patent Application No. 10171536.5, dated Jun. 28, 2011.

International Search Report corresponding to International Patent Application No. PCT/JP2008/059679.

Japanese Office Action corresponding to Japanese Patent Application No. 2009-183243, dated Jul. 28, 2011.

* cited by examiner though it is not illustrated in the figure, is input into the analog signal input unit 1 to be normalized.
MEASUREMENT APPARATUS DETECTING CONSUMPTION CURRENT OF A DISPLAY

BACKGROUND OF THE INVENTION

1. Field of the Invention

The present invention generally relates to a measurement apparatus that includes a liquid crystal display unit, and in which the power consumption is limited. More specifically, the present invention relates to the power supply to the liquid crystal display unit. In addition, the present invention relates to a measurement apparatus that includes a liquid crystal display unit and a plurality of setting units each of which sets internal data. More specifically, the present invention relates to technology for diagnosing abnormalities in consumption current in the liquid crystal display unit.

Priority is claimed on Japanese Patent Application Nos. 2009-183243, filed Aug. 6, 2009 and 2009-188977, filed Aug. 18, 2009, the content of which are incorporated herein by reference.

2. Description of the Related Art

Flow meters are used as measurement apparatuses to measure flow rates inside pipe lines used to construct plant facilities. The flow meters incorporate as a display unit a liquid crystal display module, hereinafter referred to as an LCD module, in which a transparent conductive film formed, for example, from Indium Tin Oxide, hereinafter referred to as ITO, a liquid crystal panel formed by a large number of pixels, and drivers that selectively drive the pixels of the liquid crystal panel are integrated into a single unit.

FIG. 6 is a block diagram illustrating a configuration structure of a flow meter in accordance with the related art. The flow meter includes an analog signal input unit 1, an A/D converter 2, a CPU 3, a nonvolatile memory 4, an output unit 5, a display unit 6, an internal power supply unit 7, and an external power supply 8. In FIG. 6, an analog flow rate signal S output from a sensor, which is not illustrated in the figure, is input into the analog signal input unit 1 to be normalized. Then the analog flow rate signal S that is normalized is input into the A/D converter 2 to be converted into a digital flow rate signal. Then the digital flow rate signal that is converted in the A/D converter 2 is input into the CPU 3.

The CPU 3 executes predetermined calculation processing on the digital flow rate signal in accordance with the application in which the signal is to be used, such as whether it is for external output or for display, based on programs stored in the nonvolatile memory 4. The respective calculation results are output to the output unit 5 or display unit 6.

The internal power supply unit 7 supplies power that is required to drive the respective units such as the analog signal input unit 1, the A/D converter 2, the CPU 3, and the display unit 6.

The external power supply 8 is connected to the internal power supply unit 7 through a transmission line L1. The external power supply 8 is connected to the output unit 5 through a transmission line L2. The transmission line L2 includes an adjusting resistor R. The external power supply 8 supplies power such as, for example, 24V of DC voltage to the internal power supply unit 7 via the transmission line L1. The external power supply 8 receives from the output unit 5 via the transmission line L2 and the adjusting resistor R DC current signals of between 4 and 20 mA that are associated with measured flow rate values.

The flow meter includes an LCD module as the display unit 6. The ITO film included in the LCD module may become corroded by ions which adhere thereto from an anisotropic conductive film or from contamination or the like, or by water that is present around the flow meter installation location, or by voltage that is applied when the flow meter is being operated.

In particular, in an LCD module in a flow meter which is operating at a high-temperature high-humidity installation site, deterioration is generated in the insulation around the drivers in conjunction with the corrosion of the ITO film, which causes an increase in consumption current. Any increase in consumption current is undesirable as there is a possibility that this will have a deleterious effect on the operations of two-wire measuring instruments, as well as measuring instruments having strict consumption current limitations such as battery type and radio type measuring instruments.

Liquid crystal display units such as LCDs, and setting units such as infrared touch switches and the like that set data for internal parameters are included in a measurement apparatus such as a flow meter that is used in chemical plants and factories and the like.

FIG. 7 is a block diagram illustrating a configuration structure of a measurement apparatus 1 in accordance with the related art. The measurement apparatus 1 includes an internal power supply unit 11, an A/D converter 20, a CPU 30, an LCD 40, a first setting switch 50, a second setting switch 60, a nonvolatile memory 70, and an output unit 80. Output voltage from an external power supply or internal battery, neither of which is illustrated in the figure, is input into the internal power supply unit 7. The internal power supply unit 7 generates internal power supply voltage, and supplies the internal power supply voltage to the A/D converter 20, the CPU 30, the LCD 40 and the like.

Flow rate signals FLD (i.e., processing signals), which are analog signals, are input from a sensor, which is not illustrated in the figure, into the A/D converter 20. The A/D converter 20 converts the analog signals into digital signals and then outputs the digital signals.

The CPU 30 receives the digital signals from the A/D converter 20. Then the CPU 30 reads internal parameter data from the nonvolatile memory 70, and calculates a flow rate value (i.e., a processing value) using the internal parameter data.

The CPU 30 outputs current or voltage signals which are proportional to the flow rate value via an output unit 80, and sends a display control signal DCNT that includes display data such as the flow rate value to the LCD 40. The LCD 40 displays display data such as the flow rate value included in the received display control signal DCNT.

The CPU 30 is provided with a measurement value display mode which displays the flow rate value on the LCD 40, and with an internal data setting mode which sets internal parameter data.

When the CPU 30 has been changed to the internal data setting mode, a user alters the internal parameter data by pressing the first setting switch 50 and the second setting switch 60, which are formed by infrared touch switches or the like, while viewing the current internal parameter data displayed on the LCD 40.

More specifically, internal parameter data modification signals are sent from the first setting switch 50 and the second setting switch 60 to the CPU 30. The CPU 30 modifies the internal parameter data based on the internal parameter data modification signals. The internal parameter data that is modified is stored in the nonvolatile memory 70 and is displayed on the LCD 40. Note that the internal parameters include, for example, the meter factor, flow rate span, and the like that are used to determine the flow rate.

An LCD module may be used for the liquid crystal display unit. This LCD module includes an LCD driver and the LCD

40. The LCD driver converts the display control signal DCNT into a voltage that is capable of being displayed on a liquid crystal display and drives the LCD 40.

The LCD module includes the LCD driver that is packaged on top of a glass substrate, an anisotropic conductive film, hereinafter referred to as an ACF film, which covers the LCD driver, and an ITO film that is sandwiched between the glass substrate and the LCD driver.

In the LCD module, corrosion is generated in the ITO film by ions adhering thereto from the ACF film or from contamination or the like, by peripherally present moisture, and by the voltage that is applied to the LCD driver at startup. In an LCD module that operates in a high-temperature high-humidity environment, as time passes, the progression of corrosion in the ITO film causes the insulation to deteriorate and generates an increase in consumption current.

In a two-wire processing instrument in which there is a limit on the externally supplied current, if the overall internal circuitry does not operate at 4 mA or less, the internal power supply voltage is reduced and the instrument does not operate normally. Therefore, when an LCD module is used for the two-wire processing instrument, consumption current increases and the instrument does not operate normally.

In measurement apparatuses that operate using an internal battery, the life of the battery is shortened by an increase in consumption current.

Even in measurement apparatuses other than two-wire processing instruments or measurement apparatuses that operate using an internal battery, a considerable amount of heat is generated in the internal circuitry, in particular, in the internal power supply unit 11 by an increase in consumption current, so that the lifespan of the component being used is shortened.

If an LCD module is used, when consumption current increase abnormalities are diagnosed by the CPU 30, a configuration can be employed in which the signals used for the diagnosis are newly input into the CPU 30. In this case, it is necessary to allocate an additional input port to the CPU 30, so that unless there is a surplus of input ports, creating the above type of configuration is difficult.

SUMMARY

The present invention provides a measurement apparatus that operates stably even if corrosion in an LCD module generates a deterioration in insulation which, consequently, causes the consumption current to increase.

A measurement apparatus may include a display unit including a driver, and a current limiting unit configured to supply a current from an external power supply to the driver of the display unit, the current limiting unit limiting the current.

A current value output by the current limiting unit may be equal to or less than a predetermined value. A drive current of the display unit may be limited so that the measurement apparatus operates stably even if a consumption current of the display unit becomes excessive.

The measurement apparatus may further include a CPU configured to output a logic signal that is used for displays to the display unit, and a buffer disposed between the CPU and the display unit, the buffer converting a voltage level of the logic signal.

The buffer may include an input tolerant function.

According to the present invention, even if there is a deterioration in insulation which accompanies corrosion in an LCD module and which leads to an increase in consumption current, a measurement apparatus can still be made to operate stably.

In the electric instrument of the present invention, when an LCD module (i.e., a liquid crystal display unit) is used in which corrosion and an insulation reduction are generated because of the operating conditions so that there is an increase in consumption current, abnormalities in the consumption current increase are diagnosed using existing ports which are already allocated to first and second setting switches (i.e., setting units).

A measurement apparatus may include a display unit, a current detection unit configured to output a detection signal if an increase in a consumption current of the display unit is detected, a plurality of setting units each of which is configured to output an output signal, each of the plurality of setting units changing the output signal if the detection signal is received, and a diagnosis unit configured to receive the output signal, the diagnosis unit diagnosing the increase in the consumption current.

The current detection unit may execute a detection processing of the consumption current for a first predetermined period. If the increase in the consumption current is detected, then the current detection unit changes a state of the detection signal and maintains the state until the first predetermined period ends.

The current detection unit may execute the detection processing of the consumption current for the first predetermined period after a startup processing for the display unit has finished.

Display data displayed on the display unit may be restored to displaying a correct value after the first predetermined period has elapsed.

The diagnosis unit may diagnose an abnormality in the consumption current if a changed state of the output signal has continued for a second predetermined period.

The current detection unit may include an operational amplifier configured to receive a first input of a first voltage that is obtained by splitting an internal power supply voltage, and a second input of a second voltage that is dropped from the internal power supply voltage by a voltage amount that is based on the consumption current, the operational amplifier controlling elements through which the consumption current is flowing, and a comparator configured to compare an output voltage from the operational amplifier with a third voltage that is obtained by splitting the internal power supply voltage. The current detection unit may detect an increase in the consumption current based on comparison results from the comparator.

The measurement apparatus may further include a storage unit configured to store a history of abnormalities diagnosed by the diagnosis unit.

The measurement apparatus may further include an alarm unit configured to output an alarm if an abnormality is detected by the diagnosis unit.

A measurement apparatus may include a current detection unit configured to detect a consumption current of a display unit, the current detection unit outputting a detection signal if an increase in the consumption current of the display unit is detected, a plurality of setting units each of which is configured to output an output signal, each of the setting units changing the output signal if the detection signal is received, and a diagnosis unit configured to receive the output signal, the diagnosis unit diagnosing the increase in the consumption current.

The current detection unit may execute a detection processing of the consumption current for a first predetermined period. If the increase in the consumption current is detected, then the current detection unit changes a state of the detection signal and maintains the state until the first predetermined period ends.

The current detection unit may execute the detection processing of the consumption current for the first predetermined period after a startup processing for the display unit has finished.

Display data displayed on the display unit may be restored to displaying a correct value after the first predetermined period has elapsed.

The diagnosis unit may diagnose an abnormality in the consumption current if a changed state of the output signal has continued for a second predetermined period.

The current detection unit may include an operational amplifier configured to receive a first input of a first voltage that is obtained by splitting an internal power supply voltage, and a second input of a second voltage that is dropped from the internal power supply voltage by a voltage amount that is based on the consumption current, the operational amplifier controlling elements through which the consumption current is flowing, and a comparator configured to compare an output voltage from the operational amplifier with a third voltage that is obtained by splitting the internal power supply voltage. The current detection unit may detect an increase in the consumption current based on comparison results from the comparator.

According to the present invention, when a liquid crystal display unit is used in which corrosion and a reduction in insulation are generated because of the operating conditions so that there is a resulting increase in consumption current, an output signal from a setting unit is changed based on a signal that has detected the increase in consumption current of the liquid crystal display unit, and an abnormality on the consumption current is diagnosed based on the changed output signal. As a result of this, increase abnormalities in the consumption current are diagnosed using existing ports that are already allocated to setting units.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teaching of the present invention and that the present invention is not limited to the embodiments illustrated for explanatory purpose.

First Preferred Embodiment

Figure 1:
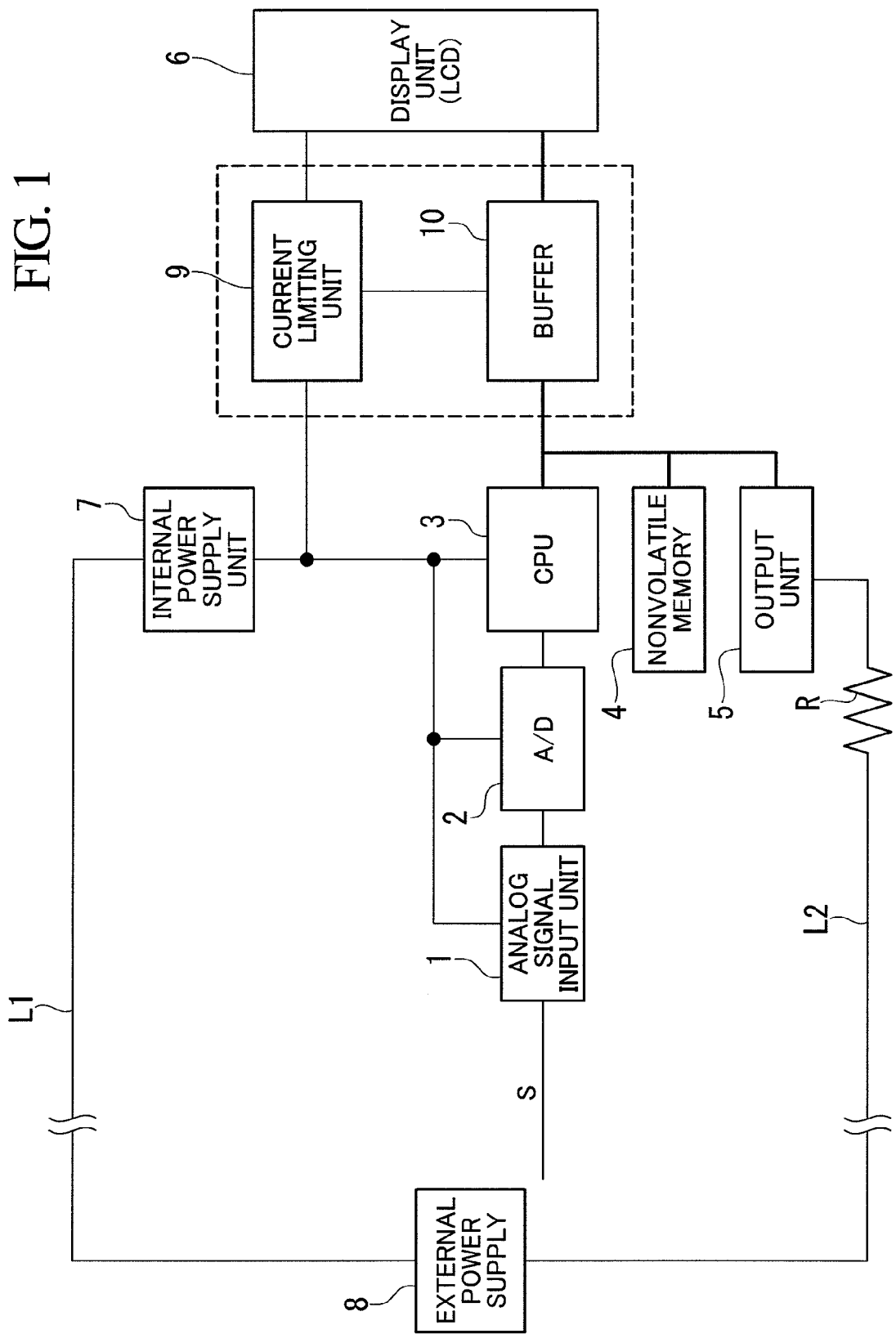
FIG. 1 is a block diagram illustrating a flow meter in accordance with a first preferred embodiment of the present invention.
Figure 6:
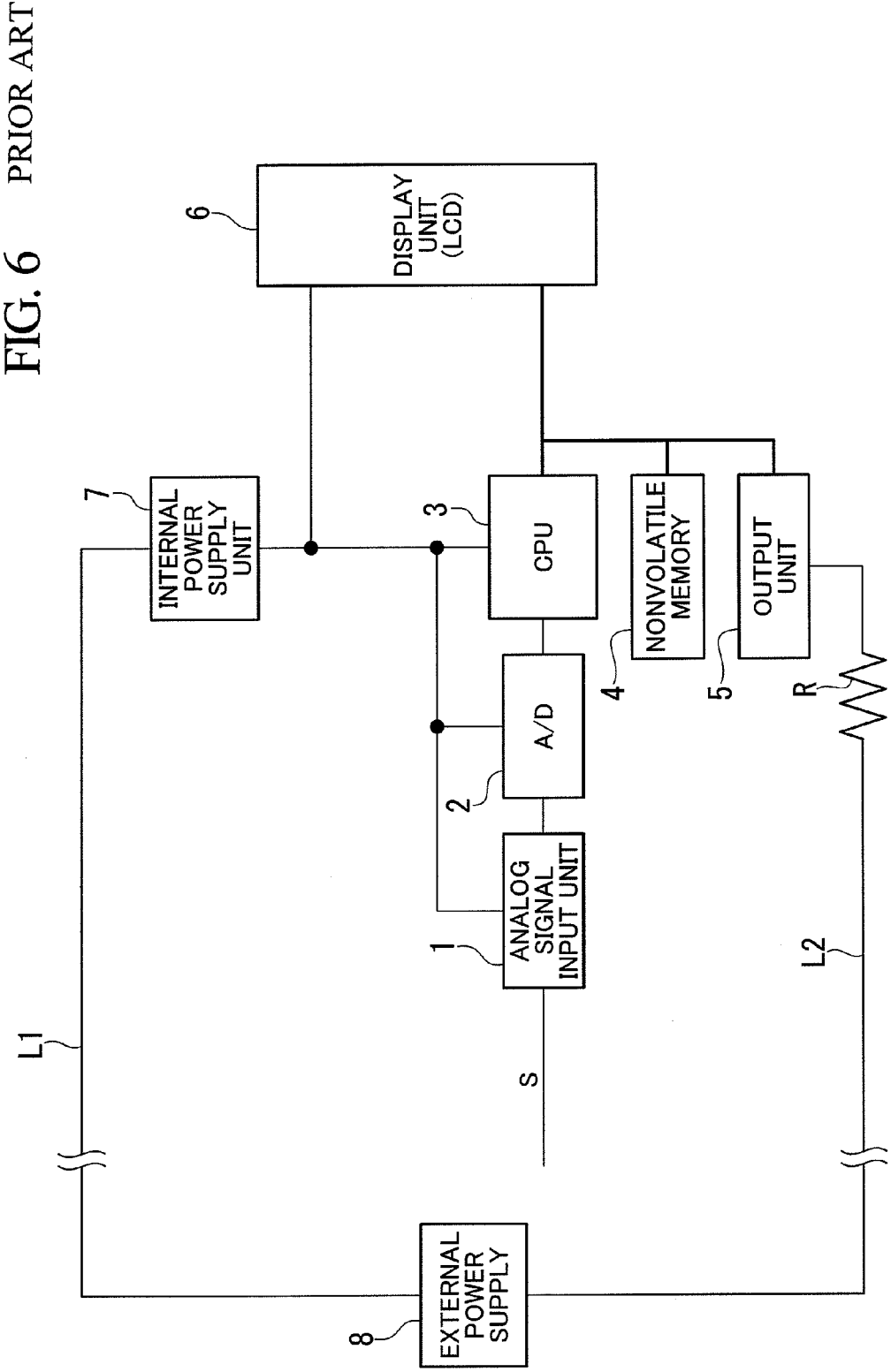
FIG. 6 is a block diagram illustrating a configuration structure of a flow meter in accordance with the related art.

A first preferred embodiment of the present invention will be described. FIG. 1 is a block diagram illustrating a flow meter in accordance with the first preferred embodiment of the present invention. Portions common to those illustrated in FIG. 6 are indicated by the same symbol. The flow meter in accordance with the first preferred embodiment of the present invention includes an analog signal input unit 1, an A/D converter 2, a CPU 3, a nonvolatile memory 4, an output unit 5, a display unit 6, an internal power supply unit 7, an external power supply 8, a current limiting unit 9, and a buffer 10. The external power supply 8 is connected to the internal power supply unit 7 through a transmission line L1. The external power supply 8 is connected to the output unit 5 through a transmission line L2. An adjusting resistor R is disposed on the transmission line L2. FIG. 1 varies from FIG. 6 in that a current limiting unit 9 is disposed between the display unit 6 and the internal power supply unit 7, and in that a buffer 10 to which power is supplied from the current limiting unit 9 is disposed between the display unit 6 and the CPU 3. An analog flow rate signal S output from a sensor, which is not illustrated in the figure, is input into the analog signal input unit 1 to be normalized. Then, the normalized analog flow rate signal S is input into the A/D converter 2 to be converted into a digital flow rate signal. Then, the digital flow rate signal converted in the A/D converter 2 is input into the CPU 3. The CPU 3 executes predetermined calculation processing on the digital flow rate signal in accordance with the application in which the signal is to be used, such as whether it is for external output or for display, based on programs stored in the nonvolatile memory 4. The respective calculation results are output to the output unit 5 or display unit 6. The internal power supply unit 7 supplies power required to drive the respective units such as the analog signal input unit 1, the A/D converter 2, the CPU 3, and the display unit 6. The external power supply 8 supplies power to the internal power supply unit 7 via the transmission line L1. The external power supply 8 receives DC current signals that are associated with the measured flow rate value from the output unit 5 via the transmission line L2 and the adjusting resistor R.

Figure 2:
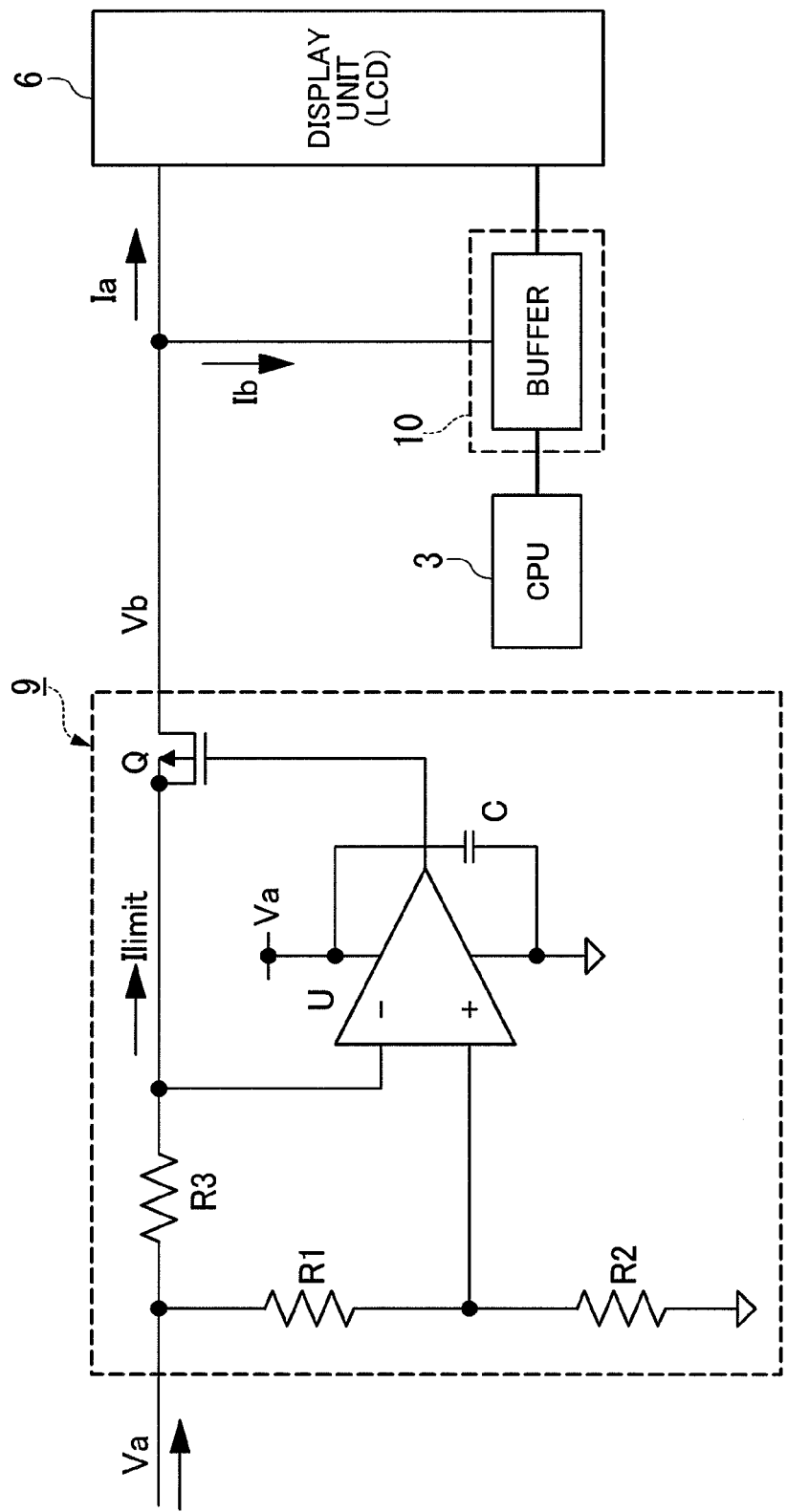
FIG. 2 is a diagram illustrating an example of a circuit of the current limiting unit in the flow meter of FIG. 1.

FIG. 2 is a diagram illustrating an example of a circuit of the current limiting unit 9 in the flow meter of FIG. 1. The current limiting unit 9 includes an operational amplifier U, a field-effect transistor Q, a resistance voltage divider circuit formed by resistors R1 and R2 that are connected together in series, a resistor R3, and a condenser C. A connection midpoint of the resistance voltage divider circuit formed by the resistors R1 and R2 that are connected together in series is connected to a non-inverting input terminal of the operational amplifier U. One end of the resistance voltage divider circuit formed by the resistors R1 and R2 is connected to the internal power supply unit 7. Output voltage Va from the internal power supply unit 7 is applied to the one end of the resistance voltage divider circuit, and the one end is also connected via the resistor R3 to the non-inverting input terminal of the operational amplifier U. The other end of the resistance voltage divider circuit formed by the resistors R1 and R2 is connected to a common potential point.

An inverting input terminal of the operational amplifier U is connected to an output terminal of the operational amplifier U via the field-effect transistor Q that forms a constant current output unit, and is also connected to the display unit 6 and the buffer 10. Specifically, the drain of the field-effect transistor Q is connected to the inverting input terminal of the operational amplifier U, while the gate of the field-effect transistor Q is connected to the output terminal of the operational amplifier U, and the source of the field-effect transistor Q is connected to the display unit 6 and the buffer 10.

The output voltage Va from the internal power supply unit 7 is applied to one power supply terminal of the operational amplifier U, and the other power supply terminal of the operational amplifier U is connected to a common potential point. In addition, the condenser C is connected between these two power supply terminals of the operational amplifier U.

Operations of the current limiting unit 9 illustrated in FIG. 2 will be described.

An input voltage Vin+, which is expressed as Vin+=Va×R2/(R1+R2), is applied to the non-inverting input terminal of the operational amplifier U.

An input voltage Vin−, which is expressed as Vin−=Va−R3×(Ia+Ib), is applied to the inverting input terminal of the operational amplifier U, where Ia is the consumption current of the display unit 6 and Ib is the consumption current of the buffer 10.

Even if the consumption current Ia of the display unit 6 is increased by corrosion as is described above, the maximum value of the current output from the current limiting unit 9 is limited to a value expressed as Ilimit=(Va−Vb)/R3.

Therefore, by setting this current limiting value Ilimit to a suitable value that that does not affect the overall meter, even if the consumption current Ia of the display unit 6 is increased by corrosion, there is no effect on the meter as a whole.

Next, operations of the buffer 10 will be described.

The power supply voltage of the display unit 6 is the voltage Vb=Vin− that is created by the current limiting unit 9. The internal power supply unit 7 supplies the current voltage Va required to drive the various units such as the analog signal input unit 1, the A/D converter 2, the CPU 3, and the display unit 6. When the current from the power supply voltage Vb is insufficient, the driver of the display unit 6 may use the power supply voltage Va and the signal line of the CPU 3 as power sources, and draw current from these to operate with.

However, if the driver of the display unit 6 does not have an input tolerant function due to there being a voltage drop by the resistor R3 so that the power supply voltage Va is higher than the power supply voltage Vb, there is a possibility that an operation malfunction will occur. The input tolerant function is a function in which, when the input is set higher than the power supply voltage, or when the power supply is 0V, current does not flow from the input towards the power supply.

Therefore, in order to solve the above problem, a buffer having the input tolerant function is used for the buffer 10, and the voltage Vb created by the current limiting unit 9 is used for the drive power supply of the buffer 10.

As a result, the power supply voltage of the display unit 6 is equal to the maximum value of the logic signal level input into the display unit 6, so that the display unit 6 can be made to operate stably. Namely, by using a buffer that uses Vb for the power supply, there is no effect on the power supply voltage Va even if current is drawn from the signal line.

In the first preferred embodiment described above, a flow meter that is used as a two-wire field instrument was described, however, the present invention is not limited to this and can also be applied to various types of measuring instruments such as battery-type or radio-type pressure gauges, temperature gauges, and transmitters and the like that include a liquid crystal display unit and have strict consumption current limitations.

As has been described above, according to the first preferred embodiment of the present invention, even if there is an increase in consumption current due to the deterioration in resistance that accompanies corrosion of an LCD module, the measurement apparatus can operate stably.

Second Preferred Embodiment

Figure 3:
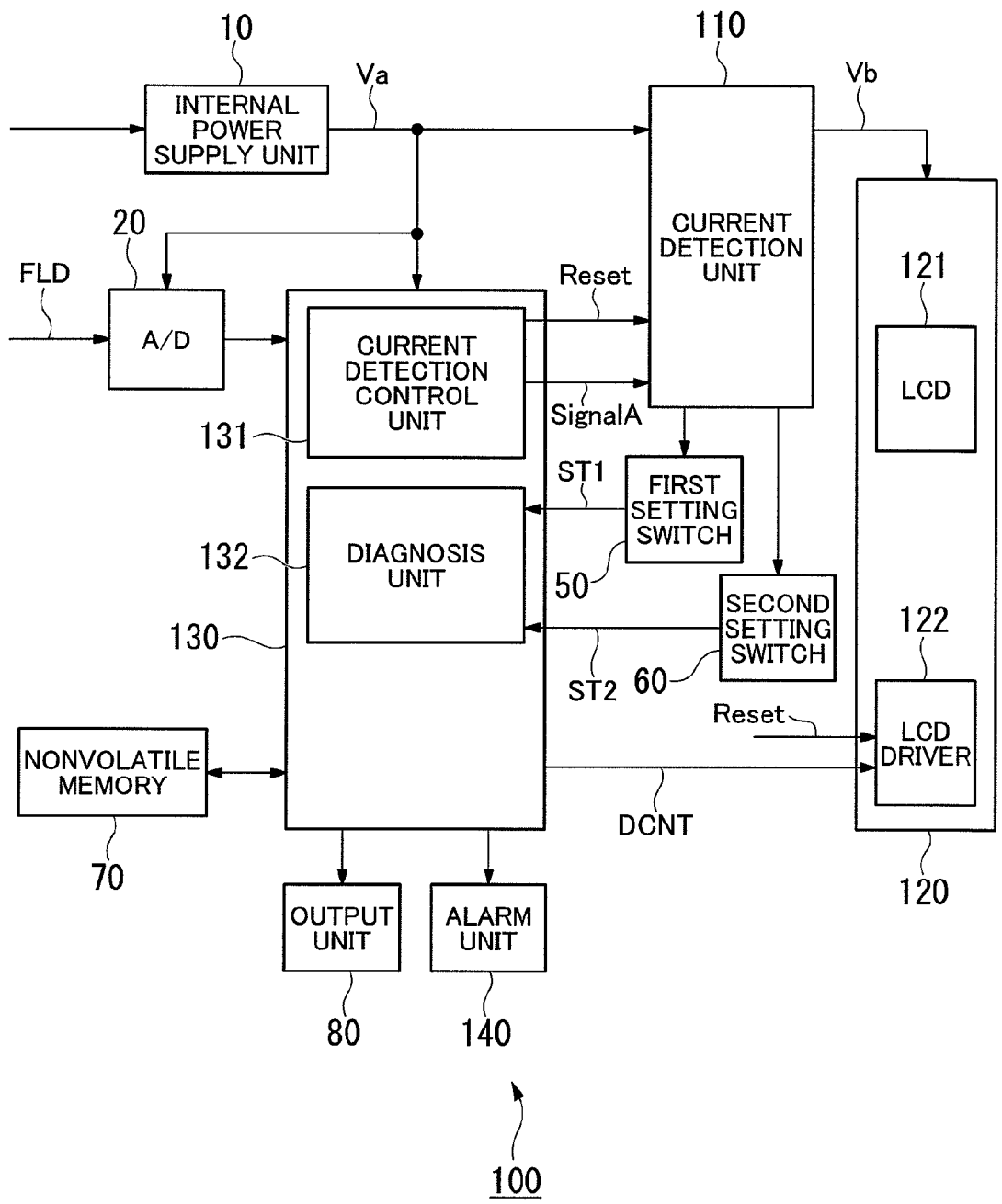
FIG. 3 is a block diagram illustrating a measurement apparatus in accordance with the second preferred embodiment of the present invention.

A second preferred embodiment of the present invention will be described. FIG. 3 is a block diagram illustrating a measurement apparatus 100 in accordance with the second preferred embodiment of the present invention.

The measurement apparatus 100 includes an internal power supply unit 11, an A/D converter 20, a first setting switch 50, a second setting switch 60, a nonvolatile memory 70, an output unit 80, a current detection unit 110, an LCD module 120, a CPU 130, and an alarm unit 140. The LCD module 120 has an LCD 121 and an LCD driver 122. The CPU 130 has a current detection control unit 131 and a diagnosis unit 132. The first setting switch 50 and the second setting switch 60 are setting units. The nonvolatile memory 70 is a storage unit. The LCD module 120 is a display unit.

The internal power supply unit 11 receives inputs of voltage from an external power supply or from an internal battery, neither of which is illustrated in the figure, and generates internal power supply voltage Va from this voltage. Then, the internal power supply unit 11 supplies the internal power supply voltage Va to the A/D converter 20, the CPU 130, and the current detection unit 110 and the like.

The A/D converter 20 receives inputs of flow rate signals FLD, which are analog signals, from a sensor that is not illustrated in the figure, and converts the flow rate signals FLD into digital signals to be transmitted to the CPU 130.

The current detection control unit 131 in the CPU 130 sends a reset signal Reset and a signal A to the current detection unit 110. The diagnosis unit 132 in the CPU 130 receives an output signal ST1 from the first setting switch 50 and an output signal ST2 from the second setting switch 60.

The CPU 130 reads data from the nonvolatile memory 70 and also writes data to the nonvolatile memory 70. The CPU 130 also sends output signals such as flow rate values to the output unit 80. In addition, the CPU 130 sends alarm signals to the alarm unit 140 and sends the display control signal DCNT to the LCD driver 122.

The current detection unit 110 generates the internal power supply voltage Vb from the internal power supply voltage Va, and supplies the internal power supply voltage Vb to the LCD module 120. In addition, in accordance with any increase in the consumption current of the LCD module 120, signals that are used to change the output signals from the first setting switch 50 and the second setting switch 60 are sent respectively to the first setting switch 50 and the second setting switch 60.

The LCD driver 122 in the LCD module 120 receives the display control signal DCNT and the reset signal Reset from the CPU 130, and displays data such as the flow rate value contained in the display control signal DCNT on the LCD 121.

Figure 7:
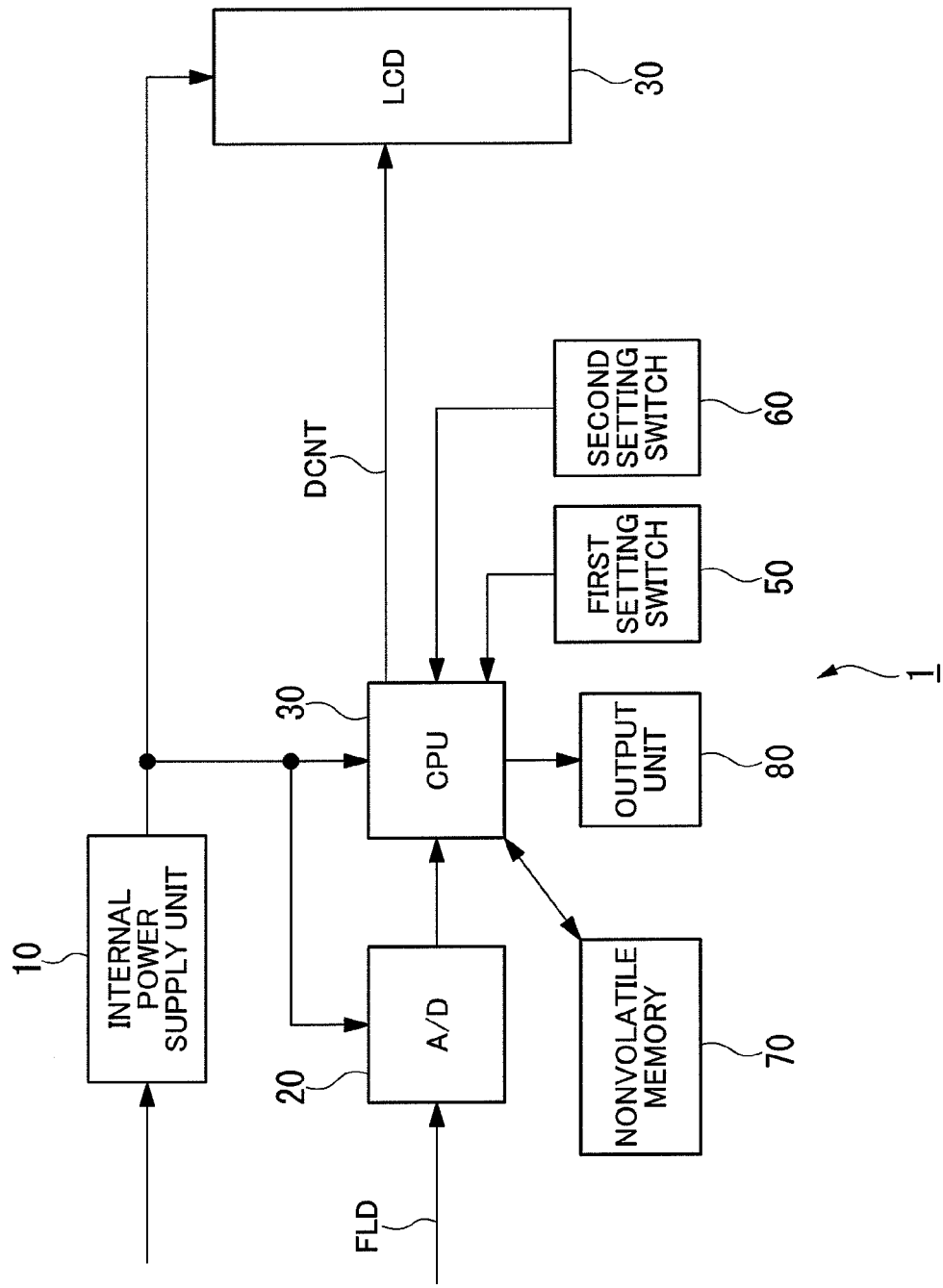
FIG. 7 is a block diagram illustrating a configuration structure of a measurement apparatus in accordance with the related art.

Note that the respective operations of the flow rate value calculation, external output, display, and internal parameter data setting and storage are executed using the A/D converter 20, the first setting switch 50, the second setting switch 60, the nonvolatile memory 70, the output unit 80, the LCD module 120, and the CPU 130. The respective operations of the flow rate value calculation, external output, display, and internal parameter data setting and storage are the same as the contents described in FIG. 7.

Figure 4:
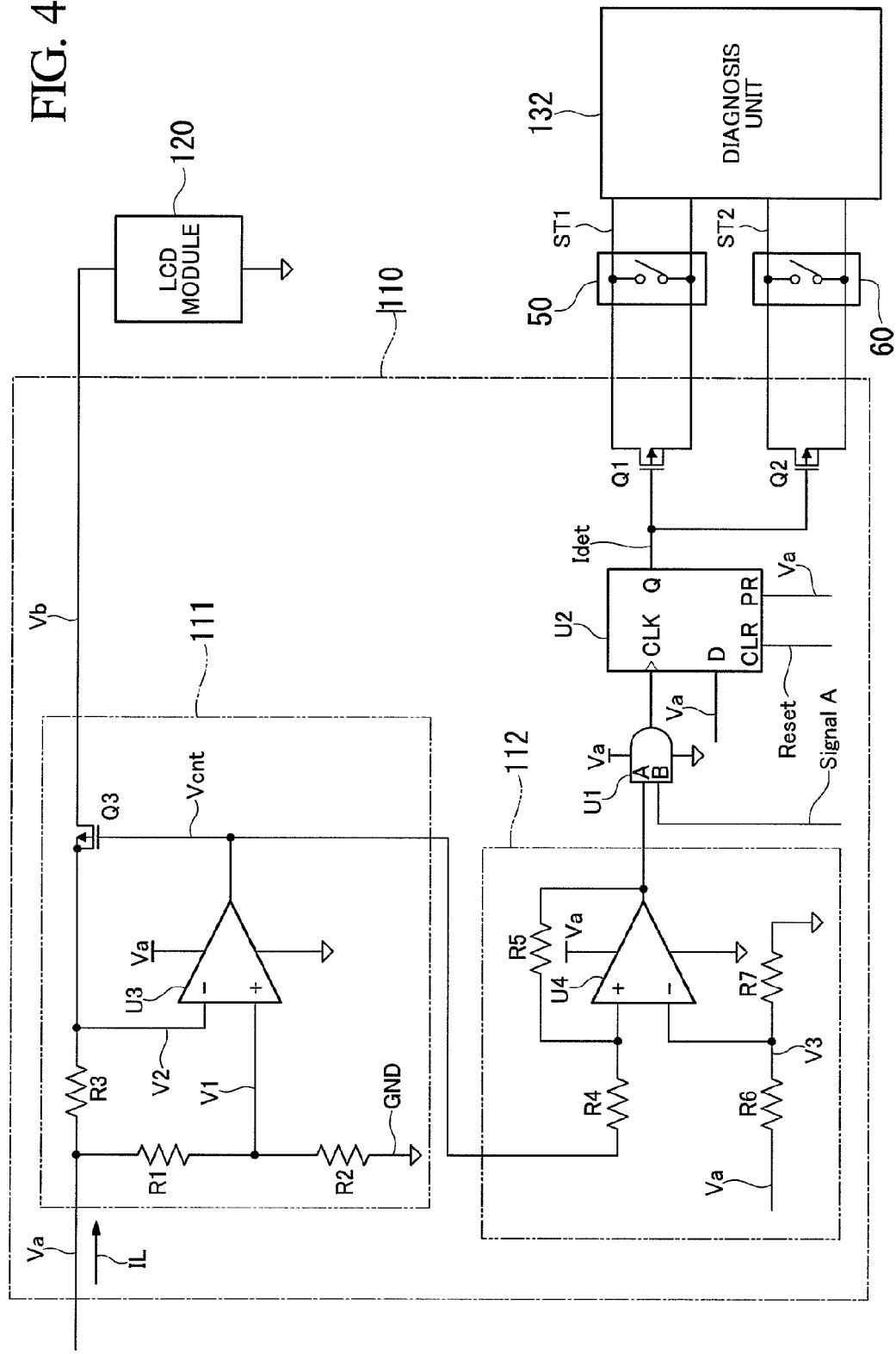
FIG. 4 is a diagram illustrating an example of a circuit of the current detection unit in the measurement apparatus of in FIG. 3.

Next, the circuitry of the current detection unit 110, which is one of the features of the second preferred embodiment, will be described using FIG. 4. FIG. 4 is a diagram illustrating an example of a circuit of the current detection unit 110 in the measurement apparatus 100 of in FIG. 3.

The current detection unit 110 includes a current limiting unit 111, a comparator circuit 112, an AND element U1, a D-type flip-flop U2, hereinafter referred to as a D-FF U2, and field effect transistors Q1 and Q2, hereinafter referred to as FETs Q1 and Q2.

The current limiting unit 111 includes the resistors R1 through R3, an operational amplifier U3, and the FET Q3. The comparator circuit 112 includes resistors R4, R5, R6 and R7 and a comparator U4.

The structure of the current limiting unit 111 will be described. The resistors R1 and R2 are connected in series between the internal power supply voltage Va and a common voltage GND. One end of the resistor R1 is connected via the resistor R3 to a source terminal of the FET Q3.

A connection point between the resistors R1 and R2 is connected to a non-inverting input terminal of the operational amplifier U3. A connection point between the resistor R3 and the source terminal of the FET Q3 is connected to an inverting input terminal of the operational amplifier U3.

An output terminal of the operational amplifier U3 is connected to a gate terminal of the FET Q3. A drain terminal of the FET Q3 is connected to the LCD module 120.

The structure of the comparator circuit 112 will be described. The output terminal of the operational amplifier U3 is connected via the resistor R4 to the non-inverting input terminal of the comparator U4. The resistor R5 is connected as a positive feedback resistor between the non-inverting input terminal and the output terminal of the comparator U4.

The resistors R6 and R7 are connected in series between the internal power supply voltage Va and the common voltage GND. A connection point between the resistors R6 and R7 is connected to an inverting input terminal of the comparator U4.

The structure of the remaining components will be described. An output terminal of the comparator U4 is connected to one input terminal A of the AND element U1. The signal Signal A is input from the current detection control unit 131 to another input terminal B of the AND element U1.

An output terminal of the AND element U1 is connected to the clock terminal, hereinafter referred to as the CLK terminal, of the D-FF U2, and the internal power supply voltage Va is input into the D terminal of the D-FF U2.

The reset signal Reset is input from the current detection control unit 131 to the clear terminal, hereinafter referred to as the CLR terminal, of the D-FF U2, and the internal power supply voltage Va is input into a preset terminal, hereinafter referred to as a PR terminal, of the D-FF U2.

An output Q terminal of the D-FF U2 is connected to the gate terminals of the FET Q1 and Q2. A drain and source of the FET Q1 is input into the diagnosis unit 132, and a contact point of the first setting switch 50 is connected between the drain terminal and the source terminal.

A drain and source of the FET Q2 is input into the diagnosis unit 132, and a contact point of the second setting switch 60 is connected between the drain terminal and the source terminal.

Next, operations of the measurement apparatus 100 will be described. At first, operations of the current limiting unit 111 will be described.

A voltage V1 (i.e., a first voltage) obtained by splitting the internal power supply voltage Va between the resistors R1 and R2 is input into the non-inverting input terminal of the operational amplifier U3. If IL is the consumption current of the LCD module 120, then a voltage V2 (i.e., a second voltage) which is the voltage drop portion obtained by multiplying the resistor R3 by the consumption current IL is input into the inverting input of the operational amplifier U3.

If the consumption current IL of the LCD module 120 is small, then the first voltage V1 is less than the second voltage V2. As a result, the output from the operational amplifier U3 is a low voltage (i.e., is equal to the common voltage GND). As a result of the output voltage from the operational amplifier U3 (a control voltage Vcnt) controlling the gate voltage of the FET Q3 through which the consumption current IL is flowing, the consumption current IL flows to the LCD module 120.

In contrast, if the consumption current IL of the LCD module 120 is large and the first voltage V1 is equal to the second voltage V2, then the output from the operational amplifier U3 changes to a high-voltage 1. At this time, the consumption current IL is found by $$IL = R1 \times Va/(R3 \times (R1+R2)) \quad (1)$$

and the current supplied to the LCD module 120 is limited to the current given by Formula (1). Note that the high-voltage 1 is equal to a voltage obtained by adding a voltage Vgs between the gate and source of the FET Q3 to the internal power supply voltage Va, and this voltage is larger than the internal power supply voltage Va.

Namely, if there is a small consumption current IL, then the output from the operational amplifier U3 is a low voltage, and the consumption current IL required to operate the LCD module 120 is supplied. If, however, the consumption current IL increases, the output of the operational amplifier U3 changes to the high-voltage 1, and the current which is supplied to the LCD module 120 is limited to the current expressed by Formula (1).

In this manner, if the consumption current IL increases, because the output voltage from the operational amplifier U3 changes to the high-voltage 1, then the increase in the consumption current IL can be detected by means of the output voltage from the operational amplifier U3.

Note that the detection of the increase in the consumption current IL may also be performed by causing the consumption current IL to flow to a resistor, which is not illustrated in the figure, and then making the detection using the voltage generated at both ends of that resistor.

Next, operations of the comparator circuit 112 will be described. The comparator circuit 112 compares the output voltage (i.e., control voltage) Vcnt from the operational amplifier U3 with the voltage V3 (i.e., a third voltage) which is obtained by dividing the internal power supply voltage Va between the resistors R6 and R7.

If the output voltage from the operational amplifier U3 is smaller than the third voltage V3, the output from the comparator U4 is a low voltage. If, however, the output voltage from the operational amplifier U3 is larger than the third voltage V3, then the output from the comparator U4 changes to a high-voltage 2. Note that the high-voltage 2 is equal to the internal power supply voltage Va.

Accordingly, it is possible to detect an increase in the consumption current IL using the output voltage from the comparator U4 in the same way as the output voltage from the operational amplifier U3.

Figure 5:
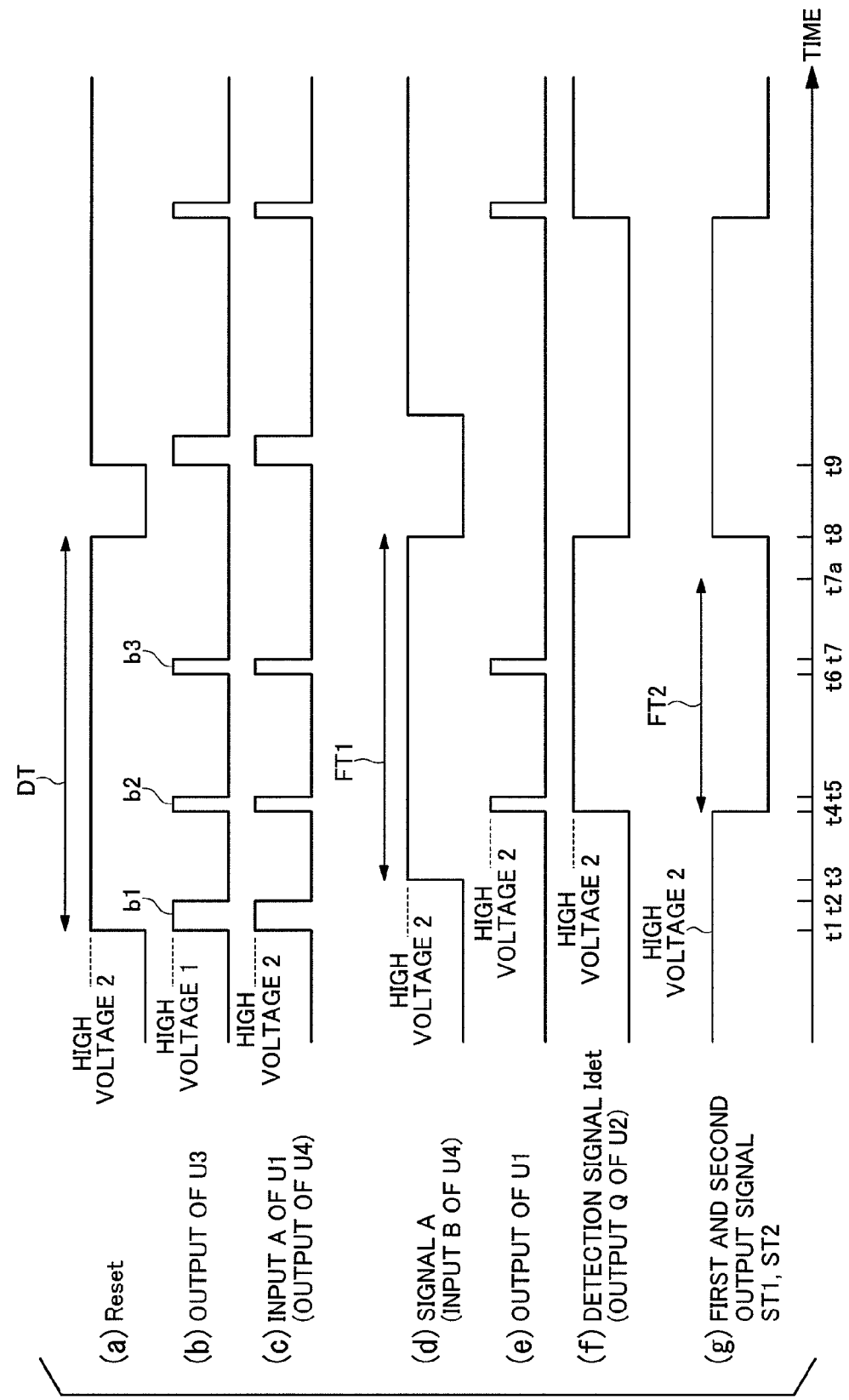
FIG. 5 is a timing chart illustrating an operation of the current detection unit in the measurement apparatus of FIG. 3.

Operations of the current detection unit 110 based on the above-mentioned type of operation will be described using the timing chart illustrated in FIG. 5. FIG. 5 is a timing chart illustrating an operation of the current detection unit 110 in the measurement apparatus 100 of FIG. 3. Note that FIG. 5 is a timing chart for a state in which a consumption current abnormality has been generated by corrosion of the LCD module 120 and by an insulation reduction.

In FIG. 5, (a) is a timing chart showing the voltage of the Reset signal, (b) is a timing chart showing the output voltage from the operational amplifier U3, (c) is a timing chart showing the input A voltage of the AND element U1 (i.e., the output voltage from the comparator U4), (d) is a timing chart showing the Signal A voltage (i.e., the input B voltage of the AND element U1), (e) is a timing chart showing the output voltage from the AND element U1, (f) is a timing chart showing the voltage of a detection signal Idet (i.e., the output Q voltage from the D-FF U2), and (g) is a timing chart showing the voltages of the first and second output signals ST1 and ST2.

The first output signal ST1 is the voltage between the contact points of the first setting switch 50, and is the output signal from the first setting switch 50 to the diagnosis unit 132. The second output signal ST2 is the voltage between the contact points of the second setting switch 60, and is the output signal from the second setting switch 60 to the diagnosis unit 132.

Note that the description in FIG. 5 is for when the first and second setting switches 50 and 60 are not being pressed by the user, namely, is for when the contact points are in an open state.

The Reset signal in FIG. 5 (a) changes from a low voltage to the high-voltage 2 at the timing t1. In addition, it changes back to a low voltage at the timing t8, and changes to the high-voltage 2 again at the timing t9. Here, the time between the timings t1 and t8 includes time for the detection and diagnosis of the consumption current, which will be described below, and this time is taken as a current detection mask time DT.

The output voltage from the operational amplifier U3 illustrated in (b) in FIG. 5 will be described. At the timing t1, the Reset signal (a) input into the LCD driver 122 changes to the high-voltage 2, and the reset state of the LCD driver 122 is canceled so that the LCD driver 122 commences startup processing.

The startup processing of the LCD driver 122 is performed from the timing t1 until the timing t2. Because startup current is flowing to the LCD driver 122 during this period, the consumption current IL of the LCD module 120 increases. Because of this, the output voltage of the operational amplifier U3 (b) changes at the timing t1 from the low voltage to the high-voltage 1 (i.e., to the portion indicated by b1 in the drawing) because of the above described current limiting operation, and changes back to the low voltage at the timing t2.

Note that the corrosion and insulation reduction of the LCD module 120 progresses gradually and slowly. Accordingly, the consumption current IL of the LCD module 120 is not increased abruptly because of the corrosion and insulation reduction of the LCD module 120, but instead makes repeated slight increases and decreases. Because the amount of the increases is slightly larger than the amount of the decreases, the consumption current IL increases slowly and steadily over a lengthy period (for example, over several days or several weeks).

When the corrosion and insulation reduction of the LCD module 120 is progressing, the current detection mask time DT is, for example, 10 seconds, and the consumption current IL makes repeated slight increases and decreases during this time.

As a result of this, the output voltage of the operational amplifier U3 (b) changes from the low voltage to the high-voltage 1 at the timing t4 (i.e., the consumption current increases (to the portion shown by b2 in the drawing)), and changes back to the low voltage at the timing t5 (i.e., the consumption current decreases). In addition, it changes from the low voltage to the high-voltage 1 at the timing t6 (i.e., the consumption current increases (to the portion shown by b3 in the drawing)), and changes back to the low voltage at the timing t7 (i.e., the consumption current decreases).

Note that the b1, b2, and b3 portions of the output voltage of the operational amplifier U3 (b) are all high-voltage 1 portions caused by increases in the consumption current IL. Here, the b1 portion is caused by the startup processing of the LCD driver 122, while the b2 and b3 portions are caused by corrosion and insulation reduction of the LCD module 120. In this manner, the causes of the increases in the consumption current IL are different in the b1 portion from the b2 and b3 portions.

When the diagnosis unit 132 (described below) has diagnosed an abnormality in the consumption current, the LCD driver 122 is changed to a reset state by the low voltage of the Reset signal (a) from the current detection control unit 131 between the timing t8 and the timing t9. At the timing t9, the reset state is canceled and startup processing commences. Consequently, the output voltage from the operational amplifier U3 (b) repeats the same types of operation as in the portions b1, b2, and b3 subsequent to the timing t9. Note that, if the diagnosis unit 132 does not diagnose an abnormality in the consumption current, the Reset signal (a) maintains the high-voltage 2, which is not illustrated in the figure, between the timing t8 and the timing t9, and the LCD driver 122 does not change to a reset state.

The voltage of the input A of the AND element U1 (i.e., the output voltage from the comparator U4) illustrated in (c) in FIG. 5 will be described.

As a result of the above described operations of the comparator circuit 112, the voltage of the input A of the AND element U1 (c) changes from the low voltage to the high-voltage 2 at the timing t1, and changes back to the low voltage at the timing t2. It performs the same changes at the timings t4 and t5 as it does at the timings t1 and t2 (i.e., low voltage→high-voltage 2→low voltage), and also performs the same changes at the timings t6 and t7 as it does at the timings t1 and t2.

Namely, the voltage of the input A of the AND element U1 (c) is the voltage when the level of the high-voltage 1 of the output voltage of the operational amplifier U3 (b) is converted into the high-voltage 2.

The AND element U1 is supplied with the internal power supply voltage Va as a power source. If the high-voltage 1 which is larger than the internal power supply voltage Va is within the input voltage range of the AND element U1, then the comparator circuit 112 is not used and the output from the operational amplifier U3 (b) can be input directly into the input A of the AND element U1 (c), so that reductions in the circuit size, space and costs can be achieved.

If, on the other hand, the input voltage range of the AND element U1 is less than the internal power supply voltage Va (i.e., the high-voltage 2), then if the output from the operational amplifier U3 (b) is input directly into the input A of the AND element U1 (c), the AND element U1 is unable to operate.

Accordingly, by using the comparator circuit 112 which performs level conversion to the high-voltage 2 and outputting the output from the comparator U4 into A of the AND element U1, the AND element U1 is able to operate.

The voltage of the Signal A illustrated in (d) in FIG. 5 (i.e., the voltage of the input B of the AND element U1), the output voltage from the AND element U1 illustrated in FIG. 5 (e), and the voltage of the detection signal Idet illustrated in (f) in FIG. 5 (i.e., the voltage of the output Q of the D-FF U2) will be described.

The voltage of the Signal A (d) changes from a low voltage to the high-voltage 2 at the timing t3 which is subsequent to the timing t2 when the startup processing of the LCD driver 122 is ended, and changes back to the low voltage at the timing t8. The same type of operation is performed at the timing t9 and thereafter.

The period from the timing t3 to the timing t8 when the voltage of the Signal A (d) is held at the high-voltage 2 is taken as a first predetermined period FT1.

The output voltage of the AND element U1 (e) is changed by the logical products of the inputs A and B from a low voltage to the high-voltage 2 at the timing t4, and changes back to a low voltage at the timing t5. In addition, it changes from the low voltage to the high-voltage 2 at the timing t6, and changes back to the low voltage at the timing t7. The same type of operation is repeated at the timing t9 and thereafter.

In the output voltage of the AND element U1 (e), those portions thereof that correspond to b2 and b3 of the output from the operational amplifier U3 (b) are output as the high-voltage 2, while the portion thereof which corresponds to b1 remains as a low voltage.

Namely, the portion of the increase in the consumption current IL which is caused by corrosion and insulation reduction in the LCD module 120 is extracted from the output voltage of the AND element U1 (e), and is output.

The internal power supply voltage Va (i.e., the high-voltage 2) is input into the D input of the D-FF U2, and the D-FF U2 holds and then outputs the state of the D input at the rise of the CLK (clock).

Because of this, the voltage of the detection signal Idet (f) changes from the low voltage to the high-voltage 2 at the timing t4. In addition, because the Reset signal (a) is input into the CLR of the D-FF U2, the voltage of the detection signal Idet (f) is cleared and changes to a low voltage at the timing t8. The same type of operation is repeated at the timing t9 and thereafter.

In this manner, the voltage of the detection signal Idet (f) changes to the high-voltage 2 at the timing t4 when the increase in the consumption current IL which is caused by corrosion is detected, and this state is maintained until the timing t8 when the first predetermined period FT1 ends.

By inputting the Signal A voltage (d) into B of the AND element U1 (i.e., by masking the input A using the input B), the voltage of the detection signal Idet (f) executes detection processing for the consumption current IL from the timing t2 when the startup processing of the LCD driver 122 ended for the first predetermined period FT1, and any increase in the consumption current which is caused by corrosion can be detected.

As a result of this, the portion of the increase in the consumption current IL that is caused by the startup processing of the LCD driver 122 is not detected, and the portion of the increase in the consumption current IL that is caused by corrosion and insulation reduction of the LCD module 120 can be detected.

Note that if the portion of the increase in the consumption current IL that is caused by the startup processing of the LCD driver 122 is small, then because the b1 portion of the output from the operational amplifier U3 (b) remains as a low voltage, it is possible instead of using the Signal A in the input B of the AND element U1 to input the internal power supply voltage Va. In this case, the output from the AND element U1 and the detection signal Idet have the same waveforms illustrated in (e) and (f) in FIG. 5.

The voltages of the first and second output signals ST1 and ST2 illustrated in (g) in FIG. 5 will now be described.

The portion between the drains and sources of the FET Q1 and Q2 is turned on when the voltage of the detection signal Idet (f) is at the high-voltage 2.

Because of this, the first and second output signals ST1 and ST2 (g), which are the respective outputs from the first and second setting switches 50 and 60 whose connection points are open, are voltages in which the low voltage and high-voltage 2 of the voltage of the detection signal Idet (f) have been switched (i.e., inverted).

Next, the abnormality diagnosis processing of the diagnosis unit 132 will be described. The diagnosis unit 132 receives the first and second output signals ST1 and ST2. The two voltages change from the high-voltage 2 to the low voltage at the timing t4, and when it is determined that this low-voltage state has continued from the timing t4 for a second predetermined period FT2 or longer, then it is judged that the consumption current IL has increased because of corrosion and a consumption current abnormality is diagnosed.

Note that it is also possible to determine that there is an abnormality in the consumption current by performing not just a single diagnosis at the current detection mask time DT, but to instead diagnose abnormalities a plurality of times repeatedly over a cycle. By doing this, it is possible to improve the diagnosis accuracy.

Here, the first predetermined period FT1 is shorter than the current detection mask time DT (for example, 10 seconds), and the second predetermined period FT2 is shorter than the first predetermined period FT1, but longer than the period for which the first and second setting switches 50 and 60 are pressed (for example, 2 to 3 seconds). Namely, the following relationships are established: current detection mask time DT (for example, 10 seconds)>first predetermined period FT1 (for example, 8 seconds)>second predetermined period FT2 (for example, 6 seconds)>period for which the first and second setting switches 50 and 60 are pressed (for example, 2 to 3 seconds).

By making the second predetermined period FT2 shorter than the time for which the first and second setting switches 50 and 60 are pressed, even if the first and second setting switches 50 and 60 are pressed (i.e., contact is made with the contact point) by a user, the diagnosis unit 132 determines that the length of time for which the first and second output signals ST1 and ST2 remain continually at a low voltage is not more than the second predetermined period FT2, and does not diagnose an abnormality in the consumption current.

As a result of this, it is possible to prevent an erroneous diagnosis being made when the first and second setting switches 50 and 60 are pressed.

Note that the reason for using two (i.e., a plurality of) setting switches is as follows. Namely, even if a user mistakenly presses the first setting switch for longer than the second predetermined period FT2, because the output signal from the other setting switch remains at the high-voltage 2, an abnormality in the consumption current is not diagnosed. By doing this, it is possible to make an accurate diagnosis and prevent an erroneous diagnosis.

According to the second preferred embodiment, the current detection unit 110 detects any increase in the consumption current IL which is caused by corrosion of the LCD module 120, and uses the detection signal Idet to change the output signals ST1 and ST2 from the first and second setting switches 50 and 60. In addition, when the changed state (i.e., the low-voltage state) of the output signals ST1 and ST2 has continued for the second predetermined period FT2 or longer, the diagnosis unit 132 is able to diagnose an increase abnormality in the consumption current IL which is caused by corrosion.

Because the output signals ST1 and ST2 of the first and second setting switches 50 and 60 are used for the transmission of the detection signal Idet to the diagnosis unit 132, it is possible to perform the abnormality diagnosis using the existing input port of the CPU 130 which is already allocated to the first and second setting switches 50 and 60. By doing this, abnormality diagnoses can be performed even when there are no surplus input ports in the CPU 130.

Moreover, even if the startup current of the LCD driver 122 is large, the input A of the AND element U1 is masked by the inputting of the Signal A signal into B of U1, and the D-FF U2 executes detection processing for the consumption current IL after the startup processing has ended. As a result of this, because the portion of the increase in the consumption current IL which is caused by the startup processing of the LCD driver 122 is not detected, it is possible to detect any increase in the consumption current IL which is caused by corrosion and an insulation reduction in the LCD module 120, and more accurate abnormality diagnoses can be achieved.

Note that when there is an increase in the consumption current IL of the LCD module 120, an erroneous value is sometimes displayed on the LCD 121. Because of this, by inputting the Reset signal into the LCD driver 122 and implementing a reset state from the timing t8 to the timing t9 (see FIG. 5 (a)), and then restarting the LCD driver 122 after the timing t9, the LCD 121 can be restored to displaying the correct value.

Next, an operation to store an abnormality history will be described. In FIG. 3, when the diagnosis unit 132 has diagnosed an abnormality in the consumption current IL which is caused by corrosion, it stores the diagnosis result and the time when the diagnosis was made in the nonvolatile memory 70.

If the abnormality history is stored in the nonvolatile memory 70, then by reading the abnormality history, a user or the like is able to ascertain previous abnormality progress and predict the rate of progress of future abnormalities (i.e., of future increases in the consumption current IL) (this is known as predictive diagnosis).

The alarm unit 140 will be described. When the diagnosis unit 132 has diagnosed an abnormality in the consumption current IL which is caused by corrosion, it causes an alarm to be output externally by the alarm unit 140.

A user or the like can be made aware of the alarm either visually (by means of a display or lights or the like) or audibly (by means of sound or the like), and can then confirm the condition of the abnormality and take suitable measures such as, for example, replacing the measurement apparatus 100.

Note that in the above description, the first and second setting switches 50 and 60 are used as setting units, however, it is also possible to use a larger number of setting switches than this. In addition to mechanical contact point switches, electronic switches or switches that detect light such as infrared rays or magnetism may also be used for the setting units.

In the above description, a processing instrument is used as an example of the measurement apparatus 100, however, the present invention is not limited to this and may be applied to other measurement apparatuses provided that such instruments are provided with a liquid crystal display unit and a setting unit for setting data.

In addition to the current detection control unit 131 and the diagnosis unit 132 executing processing in accordance with a predetermined program using a processor such as the CPU 130 or the like, this processing may also be achieved by means of a logic circuit.

As used herein, the following directional terms "forward, rearward, above, downward, vertical, horizontal, below, and transverse" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," "nearly", and "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

The present invention is not limited to the above described examples, and includes numerous modifications and variants insofar as they do not depart from the spirit or scope of the present invention. In addition, combinations of the various components other than the combinations described above are also included in the present invention.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the claims.

What is claimed is:

1. A measurement apparatus comprising:
a display unit;
a current detection unit configured to output a detection signal if an increase in a consumption current of the display unit is detected;
a plurality of setting units each of which is configured to output an output signal, each of the plurality of setting units changing the output signal if the detection signal is received; and
a diagnosis unit configured to receive the output signal, the diagnosis unit diagnosing the increase in the consumption current, wherein
the current detection unit comprises:
an operational amplifier configured to receive a first input of a first voltage that is obtained by splitting an internal power supply voltage, and a second input of a second voltage that is dropped from the internal power supply voltage by a voltage amount that is based on the consumption current, the operational amplifier controlling elements through which the consumption current is flowing; and
a comparator configured to compare an output voltage from the operational amplifier with a third voltage that is obtained by splitting the internal power supply voltage, and
the current detection unit detects an increase in the consumption current based on comparison results from the comparator.

2. The measurement apparatus according to claim 1, wherein the current detection unit executes a detection processing of the consumption current for a first predetermined period, and if the increase in the consumption current is detected, then the current detection unit changes a state of the detection signal and maintains the state until the first predetermined period ends.

3. The measurement apparatus according to claim 2, wherein the current detection unit executes the detection processing of the consumption current for the first predetermined period after a startup processing for the display unit has finished.

4. The measurement apparatus according to claim 2, wherein display data displayed on the display unit is restored to displaying a correct value after the first predetermined period has elapsed.

5. The measurement apparatus according to claim 1, wherein the diagnosis unit diagnoses an abnormality in the consumption current if a changed state of the output signal has continued for a second predetermined period.

6. The measurement apparatus according to claim 1, further comprising:

a storage unit configured to store a history of abnormalities diagnosed by the diagnosis unit.

7. The measurement apparatus according to claim 1, further comprising:

an alarm unit configured to output an alarm if an abnormality is detected by the diagnosis unit.

8. A measurement apparatus comprising:

a display unit including a driver; and a current limiting unit configured to supply a current from an external power supply to the driver of the display unit, the current limiting unit limiting the current, wherein a current value output by the current limiting unit is equal to or less than a predetermined value, and a drive current of the display unit is limited so that the measurement apparatus operates stably even if a consumption current of the display unit becomes excessive.

9. The measurement apparatus according to claim 8, further comprising:

a CPU configured to output a logic signal that is used for displays to the display unit; and a buffer disposed between the CPU and the display unit, the buffer converting a voltage level of the logic signal.

10. The measurement apparatus according to claim 9, wherein the buffer includes an input tolerant function.

11. The measurement apparatus according to claim 8, further comprising:

a CPU configured to output a logic signal that is used for displays to the display unit; and a buffer disposed between the CPU and the display unit, the buffer converting a voltage level of the logic signal.

12. The measurement apparatus according to claim 11, wherein the buffer includes an input tolerant function.

13. A measurement apparatus comprising:

a current detection unit configured to detect a consumption current of a display unit, the current detection unit outputting a detection signal if an increase in the consumption current of the display unit is detected;

a plurality of setting units each of which is configured to output an output signal, each of the plurality of setting units changing the output signal if the detection signal is received; and a diagnosis unit configured to receive the output signal, the diagnosis unit diagnosing the increase in the consumption current, wherein the current detection unit comprises:

an operational amplifier configured to receive a first input of a first voltage that is obtained by splitting an internal power supply voltage, and a second input of a second voltage that is dropped from the internal power supply voltage by a voltage amount that is based on the consumption current, the operational amplifier controlling elements through which the consumption current is flowing; and a comparator configured to compare an output voltage from the operational amplifier with a third voltage that is obtained by splitting the internal power supply voltage, and the current detection unit detects an increase in the consumption current based on comparison results from the comparator.

14. The measurement apparatus according to claim 13, wherein the current detection unit executes a detection processing of the consumption current for a first predetermined period, and if the increase in the consumption current is detected, then the current detection unit changes a state of the detection signal and maintains the state until the first predetermined period ends.

15. The measurement apparatus according to claim 14, wherein the current detection unit executes the detection processing of the consumption current for the first predetermined period after a startup processing for the display unit has finished.

16. The measurement apparatus according to claim 14, wherein display data displayed on the display unit is restored to displaying a correct value after the first predetermined period has elapsed.

17. The measurement apparatus according to claim 13, wherein the diagnosis unit diagnoses an abnormality in the consumption current if a changed state of the output signal has continued for a second predetermined period.

* * * * *